United States Patent [19]

Gillberg-LaForce et al.

[11] Patent Number: 4,728,576
[45] Date of Patent: Mar. 1, 1988

[54] LANGMUIR-BLODGETT COATING PROCESS

[75] Inventors: Gunilla E. Gillberg-LaForce, Summit; Anthony Artigliere, Jr., Madison, both of N.J.

[73] Assignee: Hoechst Celanese Corporation, Somerville, N.J.

[21] Appl. No.: 36,657

[22] Filed: Apr. 10, 1987

[51] Int. Cl.$^4$ .............................................. B05D 1/20
[52] U.S. Cl. ............................. 428/411.1; 427/434.3; 427/430.1; 427/169; 350/96.34
[58] Field of Search ................. 427/434.3, 430.1, 169; 428/411.1; 350/96.34

[56] References Cited

U.S. PATENT DOCUMENTS

| | | | |
|---|---|---|---|
| 4,536,450 | 8/1985 | Garito | 428/411.1 |
| 4,659,177 | 4/1987 | Choe et al. | 428/411.1 |
| 4,681,799 | 7/1987 | Engel | 428/220 |

Primary Examiner—Shrive P. Beck
Attorney, Agent, or Firm—Depaoli & O'Brien

[57] ABSTRACT

In one embodiment this invention provides an improved Langmuir-Blodgett procedure for producing a nonlinear optical medium consisting of a transparent substrate coated with a continuous film of at least one monomolecular layer of uniaxially aligned surface active organic molecules which exhibit nonlinear optical susceptibility.

38 Claims, 1 Drawing Figure

Langmuir-Blodgett Monolayer Isotherm for 7,7-Di(hexadecylamino)-8,8-dicyanoquinodimethane

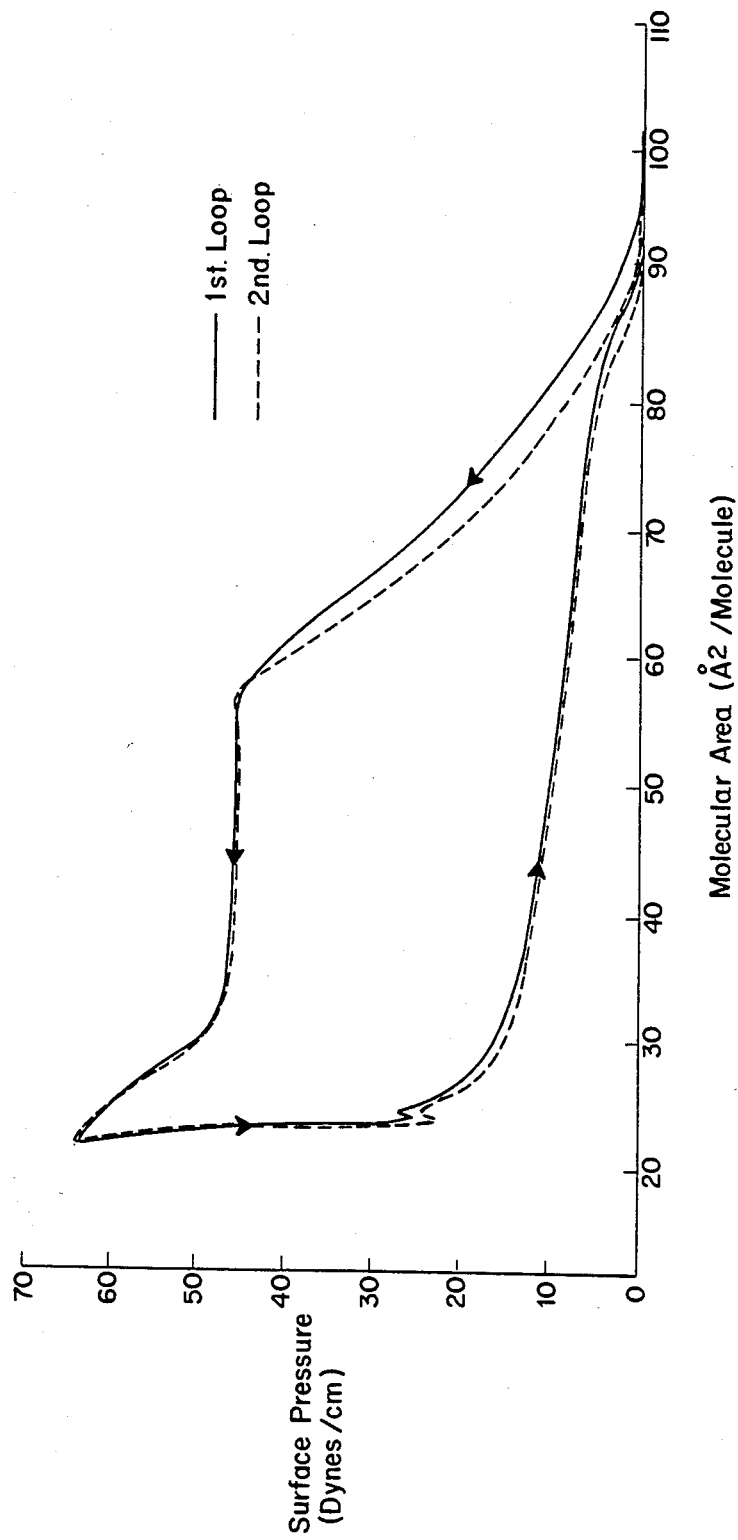

LANGMUIR-BLODGETT COATING PROCESS

BACKGROUND OF THE INVENTION

Thin organic coatings on substrates have important utility in electronic and optical devices such as photovoltaic cells, xerographic photoreceptors, gate-controlled diodes, field effect transistors, gas detectors, information storage devices, optical light switches and light modulators, and the like.

An important objective in the application of thin films to substrates is the formation of a continuous film which has uniform thickness and is free of defects and microporosity.

One preferred method of applying thin films to substrates involves the use of the Langmuir-Blodgett technique.

The Langmuir-Blodgett technique is reviewed in J. Macromol. Sci.-Rev. Macromol. Chem., C21(1), 61(1981); incorporated herein by reference.

An extensive elaboration of Langmuir-Blodgett technology is published in Thin Solid Films, Vol. 99(1983), which includes papers presented at the First International Conference On Langmuir-Blodgett Films, Durham, Great Britain, Sept. 20-22, 1982; Elsevier Sequoia S. A., Lausanne; and in Thin Solid Films, Vol. 132-134 (1985) which includes papers presented at the Second International Conference on Langmuir-Blodgett Films, Schenectady, N.Y.; incorporated herein by reference.

In 1917 Irving Langmuir developed the experimental and theoretical concepts which underlie our understanding of the behavior of organic molecules in insoluble monolayers on the surface of water. Langmuir demonstrated that long-chain fatty acids on the surface of water form films in which the molecules occupy the same cross-sectional area whatever the chain length of the molecules. The films are one molecule thick, and the molecules are oriented at the water surface, with the polar functional group immersed in the water and the long nonpolar chain directed nearly vertically up from the water surface.

This understanding of the nature of insoluble monolayers was facilitated by the development of a surface balance, which is associated with Langmuir's name.

In 1919 Langmuir reported a development in which fatty acid monolayers on water surfaces were transferred to solid supports such as glass slides. In 1933 Katherine Blodgett announced the discovery that sequential monolayer transfer could be accomplished to form built-up multilayer films, i.e., unitary laminate structures now universally referred to as "Langmuir-Blodgett films".

Grunfeld et al in Thin Solid Films, 99, 249(1983) demonstrate the application of a Langmuir-Blodgett layer as a potentially useful integrated optics component by employing the optical absorption anisotropy of a diacetylene film in a polarization mode filter.

U.S. Pat. No. 4,584,235 describes the preparation of substrates coated with a thin film of a phthalocyanine compound for use as a component in electronic and photochemical devices.

There is increasing interest in the development of new and improved techniques for coating substrates with thin solid films which have the unique properties of Langmuir-Blodgett media for electronic and optical applications.

Accordingly, it is an object of this invention to provide an improved process for depositing a thin solid film on a substrate.

It is another object of this invention to provide a substrate with a surface coating of a continuous film which is uniform in thickness and is free of defects and microporosity.

It is a further object of this invention to provide a nonlinear optical medium which is composed of a transparent substrate which is coated with at least one monomolecular layer of oriented organic molecules which exhibit nonlinear optical susceptibility.

Other objects and advantages of the present invention shall become apparent from the accompanying description and Examples.

BRIEF DESCRIPTION OF THE DRAWING

FIG. 1 is a typical isotherm for 7,7-di (hexadecylameno)-8,8 decyonoquenodemethane.

DESCRIPTION OF THE INVENTION

One or more objects of the present invention are accomplished by the provision of a process for forming a continuous film on a solid substrate which comprises coating the substrate surface by Langmuir-Blodgett deposition technique with at least one monomolecular layer of uniaxially aligned surface active organic molecules, wherein the deposition technique comprises (1) compressing the monomolecular layer of surface active organic molecules spread on the water surface in a Langmuir-Blodgett trough until the area per extended organic chain of the uniaxially aligned molecule is less than about 30 $Å^2$/chain; (2) reducing the compression on the monomolecular layer by about 5-40 dynes per centimeter; and (3) dip-coating the substrate with the monomolecular layer while maintaining a constant barrier compression on the circumscribed area of uniaxially aligned molecules spread on the water surface.

The term "surface active" as employed herein in reference to organic molecules means that, when present at low concentration in a system, the molecules have the property of adsorbing onto the surfaces or interfaces of the system and of altering to a marked degree the surface or interfacial free energies of those surfaces (or interfaces). The term "interface" indicates a boundary between any two immiscible phases; the term "surface" denotes an interface where one phase is a gas such as air.

When the step (2) Langmuir-Blodgett trough system is in equilibrium for the step(3) dip-coating cycle, the area per extended organic chain of the surface active organic molecule is between about 14-30 square angstroms, and the surface tension is between about 20-60 dynes per centimeter.

The dip-coating cycle can be repeated to form a laminate of monomolecular strata on the substrate surface.

The laminate monomolecular layers can have either a centrosymmetric or noncentrosymmetric macroscopic molecular configuration. A single monomolecular layer of uniaxial aligned dipolar organic molecules has a noncentrosymmetric molecular configuration.

A monomolecular layer can include one or more other types of organic molecules in addition to the primary surface active organic molecules, e.g., a fatty acid such as stearic acid is employed in combination with the primary component to form a composite monomolecular layer on the substrate surface. It is preferred that the size of the hydrophobic moieties of the different species of surface active molecules are comparable.

In the case of a laminate of monomolecular layers of a selected type of surface active molecules, the layers can be interlayered with monomolecular layers of a different species of surface active organic compound. In this manner the centrosymmetry or noncentrosymmetry of a laminate molecular configuration can be constructed for specific applications.

The particular molecular configuration of a substrate organic coating is critical for purposes of nonlinear optical properties.

In another embodiment this invention provides a process for preparing a nonlinear optical medium which comprises coating a transparent solid substrate surface by Langmuir-Blodgett deposition technique with a continuous film of at least one monomolecular layer of uniaxially aligned quinodimethane molecules corresponding to the formulae:

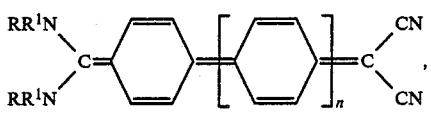

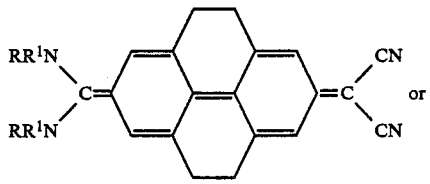

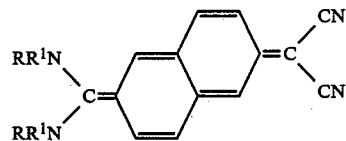

where R is a substituent selected from aliphatic, alicyclic and aromatic groups containing between about 6-30 carbon atoms, and $R^1$ is hydrogen or a R substituent; and n is an integer with a value of 0-3; wherein the deposition technique comprises (1) compressing the monomolecular layer of quinodimethane molecules spread on the water surface in a Langmuir-Blodgett trough until the area per uniaxially aligned molecule is less than about 55 Å$^2$/molecule, and preferably is between about 28-40 Å$^2$/molecule; (2) reducing the compression on the monomolecular layer by about 5-40 dynes per centimeter; and (3) dip-coating the substrate with the monomolecular layer while maintaining a constant compression on the area of uniaxial aligned quinodimethane molecules spread on the water surface.

Illustrative of the R substituent in the above quinodimethane formulae are groups which include hexyl, 2-methylhexyl, 2-chlorohexyl, 4-ethoxybutyl, hex-5-enyl, octyl, decyl, dodecyl, hexadecyl, eicosyl, cyclopentyl, cyclohexenyl, phenyl, chlorophenyl, tolyl, methoxyphenyl, benzyl, pyridyl, and the like.

Preferred quinodimethane structures of the above formulae are those in which R is an aliphatic group (e.g., alkyl) containing between about 10-20 carbon atoms, and $R^1$ is hydrogen.

The RR$^1$N group can also represent a heterocyclic structure such as piperidyl, piperazyl or morpholinyl.

The (RR$^1$N)$_2$C=moiety in the formulae can consititute a heterocyclic radical in which the two amino groups taken together with the connecting methylidene carbon atom form a cyclic structure such as imidazoline in the quinodimethane compounds:

The quinodimethane compounds can also contain substituents which have one or more optically active asymmetric centers, such as chiral isomeric structures corresponding to the formulae:

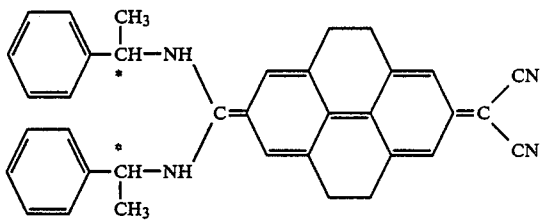

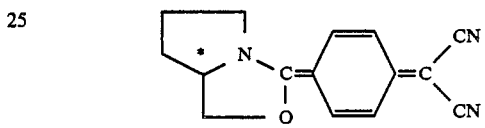

In all of the quinodimethane structural formulae illustrated herein the cyclic quinoid groups can have one or more of the hydrogen positions on the ring carbon atoms replaced with a substituent such as alkyl, halo, alkoxy, phenyl, and the like, or can be integrated as part of a more complex fused polycyclic ring structure.

Charge asymmetric quinodimethane compounds as illustrated above can be prepared by procedures described in publications such as U.S. Pat. No. 3,115,506.

The preparation of novel diphenoquinodimethanes for the practice of the present invention is described in copending patent application Ser. No. 748,583, filed June 25, 1985 now U.S. Pat. No. 4,640,800 incorporated by reference.

The following reaction scheme is illustrative of a general synthesis procedure:

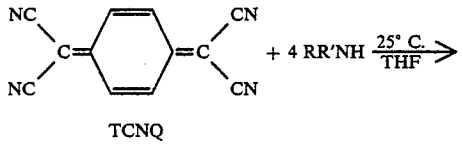

TCNQ

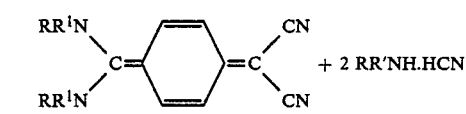

Illustrative of novel quinodimethane compounds are 7,7-di[di(decyl)amino]-8,8-dicyanoquinodimethane; 7,7-di(hexadecylamino)-8,8-dicyanoquinodimethane; 13,13-di(hexadecylamino)-14,14-dicyanodiphenoquinodimethane; 13,13-ethylenediamino-14,14-dicyanodiphenoquinodimethane; 13,13-di(hexadecylamino)-14,14-dicyano-4,5,9,10-tetrahydropyrenoquinodimethane; 13,13-ethylenediamino-14,14-dicyano-4,5,9,10-tetrahydropyrenoquinodimethane; 11,11-di(hexadecylamino)-12,12-dicyano-2,6-naphthoquinodimethane; and 11,11-ethylenediamino-12,12-dicyano-2,6-naphthoquinodimethane.

Langmuir-Blodgett Processing Embodiments

A Langmuir-Blodgett deposition procedure generally involves applying to the surface of a supporting liquid medium in a Langmuir-Blodgett trough an appropriate volume of a solution of surface active organic compound in a volatile organic solvent which preferably exhibits a rapid spreading on the subphase of supporting liquid medium. The solvent is allowed to evaporate and leave the surface active organic compound spread on the surface of the supporting liquid medium in which the organic compound is insoluble or only slightly soluble. Compression of the spread organic compound will produce a close-packed monolayer of molecules on the subphase.

The supporting liquid medium usually is water, or an aqueous mixture of water and a water-miscible solvent such as ethanol or acetone. A supporting aqueous medium can contain other components such as metal ions, pH control agents, and the like.

The term "water" as employed herein in reference to a supporting liquid medium is meant to include aqueous mixtures of water with other liquid medium constituents as described above.

Transfer of the surface active organic compound from the supporting liquid medium surface to a substrate such as a glass slide is accomplished by dipping the substrate vertically into the supporting liquid medium, and withdrawing the substrate at a constant slow rate so that the surface film of surface active organic compound adheres to the surface area of the substrate in the form of a continuous monomolecular layer of uniaxially aligned molecules.

Provision of means for maintaining the integrity of the film on the supporting liquid medium surface is essential. This can be achieved efficiently by the utilization of a Langmuir-Blodgett film microbalance system, which constantly measures the surface pressure of the film layer and applies a constant pressure on the surface-spread film layer with a movable barrier.

A deposited film coating on a substrate typically has a monomolecular thickness between about 10–40 angstroms. Multilayer laminates produced by repeated dipcoating can have a thickness of 50–100 angstroms and higher, as required for specific applications. As noted previously, the laminate layers respectively can consist of the same surface active organic compound or of a different composition.

Nonlinear Optical Media

The present invention is particularly advantageous for the production of single layer and multilayer films of uniaxially aligned molecules which exhibit nonlinear optical properties.

A present invention Langmuir-Blodgett process embodiment can provide a film coated substrate which is optically transparent and exhibits nonlinear optical properties such as second harmonic and third harmonic generation; and the linear electrooptic (Pockels) effect. For second harmonic generation, the bulk phase of the organic film does not possess a real or orientational average inversion center. The monomolecular layer or layers have a macroscopic noncentrosymmetric structure.

Harmonic generation measurements relative to quartz can be performed to establish the value of second order and third order nonlinear optical susceptibility of the substrates.

In the case of macroscopic nonlinear optical substrates that are composed of noncentrosymmetric sites on the molecular and unit cell level, the macroscopic second order nonlinear optical response $\chi^{(2)}$ is comprised of the corresponding molecular nonlinear optical response $\beta$. In the rigid lattice gas approximation, the macroscopic susceptibility $\chi^{(2)}$ is expressed by the following relationship:

$$\chi_{ijk}(-\omega_3; \omega_1, \omega_2) = Nf^{\omega_3}f^{\omega_2}f^{\omega_1} <\beta_{ijk}(-\omega_3; \omega_1, \omega_2)>$$

wherein N is the number of sites per unit volume, f represents small local field correlations, $\beta_{ijk}$ is averaged over the unit cell, $\omega_3$ is the frequency of the created optical wave, and $\omega_1$ and $\omega_2$ are the frequencies of the incident fundamental optical waves.

These theoretical considerations are elaborated by Garito et al in chapter 1 of the ACS Symposium Series 233, American Chemical Society, Washington, D.C. (1983); and by Lipscomb et al in J. Chem., Phys., 75, 1509 (1981), incorporated herein by reference. See also Lalama et al, Phys. Rev., A20, 1179 (1979); and Garito et al, Mol. Cryst. and Liq. Cryst., 106, 219 (1984); incorporated herein by reference.

The theory and practice of high performance nonlinear optical media, with specific reference to Langmuir-Blodgett films and charge asymmetric quinodimethane type compounds, is elaborated in related copending patent application Ser. No. 797,465, filed Nov. 11, 1985 now U.S. Pat. No. 4,659,177; incorporated herein by reference.

The following examples are further illustrative of the present invention. The components and specific ingredients are presented as being typical, and various modifications can be derived in view of the foregoing disclosure within the scope of the invention.

General Procedure For Examples

A.

The trough system (Joyce-Loebl) employed is the constant-perimeter type with a teflon-coated glass fiber barrier. The barrier rollers are positioned to facilitate symmetric compression from both ends of the trough. The maximum area is 1038 cm² and the minimum area is 110 cm². The subphase-containing bath is machined from a solid block of pure teflon, with a dipping well and with tubing for temperature control by a circulating bath. The surface pressure is measured via the Wilhelmy plate method using a thin strip of filter paper (0.5 or 1.0 cm wide) as the plate. A differential feedback system is incorporated into the trough system to maintain the desired surface pressure during the deposition of the organic monomolecular layer onto the dipped substrate.

The deposition is performed by passing a substrate vertically through the air-water interface with the compressed monolayer. The dipping is accomplished by a micrometer-controlled transport mechanism which provides an accurate determination of the substrate area exposed during the monolayer transfer. The transfer ratio is calculated from the exposed substrate area and the measured decrease in trough surface area of the monolayer on the subphase during each transfer cycle.

Generally, deposition is performed on substrates consisting of Corning microscope slides (No. 2947) cut to 1"×2" dimensions. The glass substrates have to be rigorously cleansed for successful deposition. The cut slides are evenly spaced in a teflon carrier (Flouoroware ®) and submerged in an acetone bath for 15-20 minutes of ultrasonic action. The substrates then are treated with a 10% sodium hydroxide aqueous solution in the ultrasonic bath for 20 minutes. This step is followed by a thorough rinsing with ultrapure water (18 megohm.cm, Millipore ® system), then by a one minute soak in 50% nitric acid solution, an ultrasonic water wash, and a thorough rinsing with ultrapure water. The substrates are stored under water and thoroughly rinsed before utilization.

The glass slides are used in their clean form, or the slides are hydrophobized, e.g., by a gas-phase reaction with a disilazane. In one procedure the water-wet slides are first oven-dried (110° C.) and then placed in a desiccator over a pool of 1,1,1,3,3,3-hexamethyldisilazane to effect the desired hydrophobization.

The preferred subphase for the deposition procedure is ultrapure water optionally containing salts such as $10^{-4}$ M $CdCl_2$ for increased stability of monolayers containing acidic hydrophilic groups, or containing pH adjusting chemicals or the like. The subphase is swept several times and the surface water is siphoned off until no surface pressure change is observed during the compression, which indicates that no interfering surface active contaminants are present.

The organic monolayer forming substance is carefully purified by recrystallization and/or solvent chromatography. The pure solid is dissolved in a solvent which preferentially is not soluble in the subphase, and which exhibits good spreading on the subphase and has a reasonable evaporation rate. The concentration is chosen so that the dispension of 50-300 μl of solution will provide a surface concentration of the monolayer forming substance sufficiently low that very little or no surface pressure results.

With the trough in the maximum area position, the solution is dispensed onto the subphase at several different areas to yield a surface concentration of approximately 1 molecule/120 $Å^2$ or less using a Gilmont ® micrometer buret (50-300 μl). The compression cycle is started after enough time has elapsed as necessary for evaporation of solvent and dissociation of possible complexes of organic moecules in the monolayer. This time can vary between about 10-30 minutes depending on such factors as the evaporation rate of the solvent, possible complex formation, the temperature of the subphase, and the like. The compression action is conducted at a rate of 5-20 $Å^2$/molecule/minute, producing the characteristic isotherm of a given surface active monolayer. Higher or lower rates can be used depending on the system. By expanding the enclosing barrier, a hysteresis-type plot can be generated.

The procedure for deposition of monolayers is the same except that the substrate has to be appropriately positioned either above (hydrophobic substrates) or within (hydrophilic substrates) the subphase. However, as the pressure approaches the desired dipping pressure the control unit is switched into the feedback loop to maintain a constant pressure. Once the reference pressure is obtained, the system is equilibrated for five minutes to ensure monolayer stability.

The deposition is performed at a vertical speed of 0.1 mm/second. Slower or higher speeds also can be employed, depending on the direction of deposition, the type of monolayer, and the subphase temperature. There is a brief pause between the down and up cycle (when the substrate is within the subphase) to control system stability, and a longer pause between the up and down cycle (when the substrate is in air) to allow any possible entrapped water to evaporate.

7,7-di(alkylamino)-8,8-dicyanoquinodimethane

The quinodimethane is synthesized following a procedure described in U.S. Pat. No. 3,115,506. The quinodimethane is recrystallized several times from ethanol, and finally from tetrahydrofuran. The solid is dissolved in chloroform (stabilized with ethanol) in a concentration between 0.2-1.2 g/l. The addition of ethanol prevents formation of acid degradation products of chloroform which would react with the quinodimethane, and the ethanol also reduces the tendency of the quinoid molecules to form complexes. An ethanol content of 0.7% or higher is preferred.

Enough solution is dispensed onto the subphase to yield a surface concentration of approximately 120 $Å^2$/molecule. An evaporation period of at least 10 minutes is allowed before compression of the monolayer is performed at a rate of 7-10 $Å^2$/molecule/minute. The subphase temperature is in the range of 10°-30° C., preferably in the range of 18°-24° C.

The pH of ultrapure water is 5.5. The addition of salts, such as $10^{-3}$ M of $Na_2HPO_4$ buffer to provide a pH of 9, does not affect the monolayer isotherm. A typical isotherm for 7,7-di(hexadecylamino)-8,8-dicyanoquinodimethane, recorded at 20° C., is illustrated in FIG. 1. The isotherm is characterized by a plateau region for molecular areas between 55-35 $Å^2$/molecule.

Deposition generally is performed on a point of the isotherm where there is a comparatively rapid change in the surface pressure with the molecular area. Deposition on the first rise would yield molecular areas larger than 60$Å^2$/molecule, i.e., 30$Å^2$ per alkyl chain. Monolayers of fatty acids or fatty alcohols are reported to yield a limitation area of 19-20 $Å^2$ per alkyl chain. Thus, the first rise will not yield an optimally ordered monolayer. Asymmetric samples of the quinodimethane obtained by depositing alternative layers of the quinoid and another monolayer forming substance such as arachidic acid does not yield any second order nonlinear optical response when the quinoid monolayer has a molecular area of about 55-65 $Å^2$/molecule. This is an indication of poor uniaxial alignment. Deposition on the second rise will yield areas of 14-16 $Å^2$. Molecular modeling of closely packed methyl groups and hexane molecules has shown that a limiting area of 14 $Å^2$/group or chain is possible by a slight staggering. The monolayer resulting from such a close packing can be expected to be rather rigid.

The present invention process embodiments as illustrated in the Examples allow the compression of the surface active monolayer to yield closely packed alkyl chains without the extreme rigidity which prevents an effective vertical uniaxial deposition of the monolayer. The present invention process embodiments also achieve monolayer compression to a point on the isotherm plateau, and then impart a relaxation in the surface pressure in such a way that a controlled deposition of monolayer on a substrate is accomplished.

EXAMPLE I

This Example illustrates a Langmuir-Blodgett film deposition in accordance with a conventional procedure.

A 230 μl quantity of a chloroform solution of 7,7-di(hexadecylamino)-8,8-dicyanoquinodimethane at a concentration of 0.4214 g/l is spread on the surface of ultrapure water which is at a temperature of 23° C. After 30 minutes of solvent evaporation, compression at a rate of 0.2 Å$^2$/molecule/minute is performed until a surface area of 29 Å$^2$/molecule is obtained. A constant deposition pressure of 55 dynes/cm is maintained, and deposition is commenced with a glass substrate (hydrophobized by hexamethyldisilazane) positioned in air, and a vertical dipping speed of 0.1 mm/sec. is employed. Eight layers are deposited, then the residual monolayer is allowed to expand to maximum area, and a 50 μl quantity of the quinoid solution is added to compensate for the removed quinoid. The monolayer is compressed again in the previous manner and two more layers are deposited.

The average transfer ratio for the down deposition is 48% and for the up deposition is 82%. A general tendency of a declining transfer ratio is observed during the deposition of each monolayer respectively. The poor transfer ratios indicate that uniaxial molecular order in the monolayer is lost during the deposition.

EXAMPLE II

This Example illustrates Langmuir-Blodgett film deposition in accordance with the present invention.

A 225 μl quantity of a 7,7-di(hexadecylamino)-8,8-dicyanoquinodimethane/chloroform solution (0.4214 g/l) is spread on an ultrapure water subphase having a temperature of 18° C. Compression at a rate of 0.2 Å$^2$/molecule/minute is commenced 60 minutes after the spreading phase. The monolayer is compressed to 29 Å/molecule and a surface pressure of 55 dynes/cm, then expanded slightly at the same rate to 35 Å$^2$/molecules and a surface pressure of 20 dynes/cm. The monolayer is recompressed to 32 Å$^2$/molecule and a surface pressure of 35 dynes/cm.

A glass substrate (hydrophobized with hexamethyldisilazane) is dipped vertically through the monolayer at a speed of 0.1 mm/second. The substrate is held steady in the down position for 2–3 minutes before it is withdrawn at the same rate of speed. The substrate is held in the air for about 5 minutes before the dipping cycle is repeated. After four layers have been deposited, the residual monolayer is expanded to its maximal area on the subphase and a 50 μl quantity of the quinoid solution is added to replace previously removed monolayer. After a 30 minute evaporation period, the same cycle of compression, expansion and recompression is performed to provide a relaxed monolayer with a surface area of 32 Å$^2$/molecule and a surface pressure of 35 dynes/cm. Six more layers are deposited onto the substrate. The process is repeated with a newly spread monolayer, and another four layers are deposited twice to yield a glass substrate with a total of 18 symmetric layers of the quinoid compound.

The average transfer ratio for layers deposited on the downstroke is 84%, and on the upstroke is 100%.

EXAMPLE III

This Example illustrates a Langmuir-Blodgett film deposition in accordance with the present invention.

A 80 μl quantity of 7,7-di(hexadecylamino)-8,8-dicyanoquinodimethane/chloroform solution with a concentration of 1.201 g/l is spread on an ultrapure water subphase at 22° C. Compression at a rate of 9 Å$^2$/molecule/minute is started after 20 minutes evaporation time. The monolayer is compressed to a molecular area of 37 Å$^2$/molecule at a surface pressure of 50 dynes/cm, expanded at the same rate to 42 Å$^2$/molecule (20 dynes/cm) and then slightly recompressed to 40 Å$^2$/molecule at a feedback surface pressure of 35 dynes/cm. A cover glass, which has been hydrophobized by means of a one minute immersion in a dilute solution of octadecyltrichlorosilane and then washed with chloroform, is used as a substrate. A dipping speed of 0.1 mm/second is employed for the first downward cycle, then increased to 0.2 mm/second for the remainder of the deposition cycles.

A total of 18 layers are deposited with essentially 100% transfer ratio both on the downward and upward stroke cycles.

EXAMPLE IV

This Example illustrates a Langmuir-Blodgett film deposition in accordance with a conventional procedure.

A Langmuir-Blodgett trough is filled with ultrapure water containing $2.74 \times 10^{-4}$ M $CdCl_2$ and the temperature of the aqueous medium is regulated to 23° C. A cleaned hydrophilic glass substrate is positioned below the surface of the aqueous subphase. 230 μl of 7,7-di(hexadecylamino)-8,8-dicyanoquinodimethane in chloroform (0.4214 g/l) is spread on the subphase. After 30 minutes of evaporation time, compression at a rate of 7.9 Å$^2$/molecule/minute is commenced. The monolayer is compressed to the second rise of the isotherm to a molecular area of 25 Å$^2$/molecule and a surface pressure of 55 dynes/cm.

Deposition of one monolayer of the quinodimethane is accomplished by withdrawing the substrate from the subphase at a rate of 0.1 mm/sec. The transfer ratio is a low value of about 25%. The monolayer then is removed from the subphase and 150 μl of arachidic acid in chloroform (1.5 g/l) is spread on the subphase. After 30 minutes of evaporation time, the monolayer is compressed at a rate of 8.1 Å$^2$/molecule/minute to a molecular area of 21.6 Å$^2$/molecule at a surface pressure of 35 dynes/cm. Two deposition cycles are executed, one downward and one upward, using the glass substrate with one monolayer of quinodimethane yielding two overlayers of arachidic acid. The transfer ratio for the arachidic acid is 100%.

The resultant transparent coated glass substrate H exhibits a second order nonlinear optical susceptibility $\chi^{(2)}$ which is about 1.6 times the second order nonlinear optical response of a corresponding uncoated glass substrate.

EXAMPLE V

This Example illustrates a Langmuir-Blodgett film deposition in accordance with the present invention.

The monolayer deposition procedure of Example IV is repeated, except for the following modifications After compression of the quinodimethane monolayer to 28 Å$^2$/molecule and 55 dynes/cm, the monolayer is expanded slightly to 34 Å$^2$/molecule and 20 dynes/cm, and then recompressed to 32 Å$^2$/molecule and 35 dynes/cm. An upward monolayer deposition on the hydrophilic glass substrate is executed, with a transfer ratio of 82%. Two overlayers of arachidic acid then are deposited with a 100% transfer ratio, onto the quinodimethane monolayer utilizing the same conditions as in Example IV.

The resultant transparent coated glass substrate exhibits a second order nonlinear optical susceptibility $\chi^{(2)}$ which is about 2.8 times the second order nonlinear optical response of a corresponding uncoated glass substrate.

What is claimed is:

1. A process for forming a continuous film on a solid substrate which comprises coating the substrate surface by Langmuir-Blodgett deposition technique with at least one monomolecular layer of uniaxially aligned surface active organic molecules, wherein the deposition technique comprises (1) compressing the monomolecular layer of surface active organic molecules spread on the water surface in a Langmuir-Blodgett trough until the area per extended organic chain of the uniaxially aligned molecule is less than about 30 Å$^2$/chain; (2) reducing the compression on the monomolecular layer by about 5–40 dynes per centimeter; and (3) dip-coating the substrate with the monomolecular layer while maintaining a constant compression on the area of uniaxially aligned molecules spread on the water surface.

2. A process in accordance with claim 1 wherein the area per extended organic chain of the molecule in step(2) is between about 14–30 square angstroms, and the surface tension is between about 20–60 dynes per centimeter.

3. A process in accordance with claim 1 wherein the continuous film on the substrate surface comprises at least two monomolecular layers of uniaxially aligned organic molecules.

4. A process in accordance with claim 1 wherein the continuous film on the substrate surface has a centrosymmetric molecular configuration.

5. A process in accordance with claim 1 wherein the continuous film on the substrate surface has a noncentrosymmetric molecular configuration.

6. A process for preparing a nonlinear optical medium which comprises coating a transparent solid substrate surface by Langmuir-Blodgett deposition technique with a continuous film of at least one monomolecular layer of uniaxially aligned quinodimethane molecules corresponding to the formula:

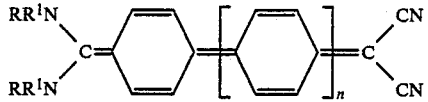

where R is a substituent selected from aliphatic, alicyclic and aromatic groups containing between about 6–30 carbon atoms, and R$^1$ is hydrogen or an R substituent; and n is an integer with a value of 0–3; wherein the deposition technique comprises (1) compressing the monomolecular layer of quinodimethane molecules spread on the water surface in a Langmuir-Blodgett trough until the area per uniaxially aligned molecule is less than about 55 Å$^2$/molecule; (2) reducing the compression on the monomolecular layer by about 5–40 dynes per centimeter; and (3) dip-coating the substrate with the monomolecular layer while maintaining a constant compression on the area of uniaxially aligned quinodimethane molecules spread on the water surface.

7. A process in accordance with claim 6 wherein n in the quinodimethane formula is zero.

8. A process in accordance with claim 6 wherein n in the quinodimethane formula is one.

9. A process in accordance with claim 6 wherein the R substituent in the quinodimethane formula is in an alkyl group containing between about 10–20 carbon atoms, and R$^1$ is hydrogen.

10. A process in accordance with claim 6 wherein the substrate surface coating comprises at least two monomolecular layers of uniaxially aligned quinodimethane molecules.

11. A process in accordance with claim 6 wherein the nonlinear optical medium exhibits second order nonlinear optical susceptibility $\chi^{(2)}$.

12. A process in accordance with claim 6 wherein the nonlinear optical medium exhibits third order nonlinear optical susceptibility $\chi^{(3)}$.

13. A process in accordance with claim 6 wherein the quinodimethane is 7,7-di[di(decyl)amino]-8,8-dicyanoquinodimethane.

14. A process in accordance with claim 6 wherein the quinodimethane is 7,7-di(hexadecylamino)-8,8-dicyanoquinodimethane.

15. A process in accordance with claim 6 wherein the quinodimethane is 13,13-di(hexadecylamino)-14,14-dicyanodiphenoquinodimethane.

16. A process in accordance with claim 6 wherein the quinodimethane is 13,13-ethylenediamino-14,14-dicyanodiphenoquinodimethane.

17. A process for preparing a nonlinear optical medium which comprises coating a transparent solid substrate surface by Langmuir-Blodgett deposition technique with a continuous film of at least one monomolecular layer of uniaxially aligned quinodimethane molecules corresponding to the formula:

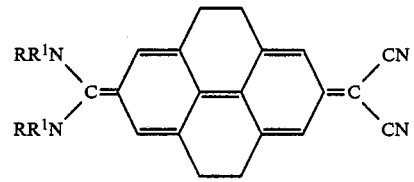

where R is a substituent selected from aliphatic, alicyclic and aromatic groups containing between about 6–30 carbon atoms, and R$^1$ is hydrogen or a R substituent; wherein the deposition technique comprises (1) compressing the monomolecular layer of quinodimethane molecules spread on the water surface in a Langmuir-Blodgett trough until the area per uniaxial aligned molecule is less than about 55 Å$^2$/molecule; (2) reducing the compression on the monomolecular layer by about 5–40 dynes per centimeter; and (3) dip-coating the substrate with the monomolecular layer while maintaining a constant compression on the area of uniaxially aligned quinodimethane molecules spread on the water surface.

18. A process in accordance with claim 17 wherein n in the quinodimethane formula is zero.

19. A process in accordance with claim 17 wherein n in the quinodimethane formula is one.

20. A process in accordance with claim 17 wherein the R substituent in the quinodimethane formula is in an alkyl group containing between about 10–20 carbon atoms, and R$^1$ is hydrogen.

21. A process in accordance with claim 17 wherein the substrate surface coating comprises at least two monomolecular layers of uniaxially aligned quinodimethane molecules.

22. A process in accordance with claim 17 wherein the nonlinear optical medium exhibits second order nonlinear optical susceptibility $\chi^{(2)}$.

23. A process in accordance with claim 17 wherein the nonlinear optical medium exhibits third order nonlinear optical susceptibility $\chi^{(3)}$.

24. A process in accordance with claim 17 wherein the quinodimethane is 13,13-di(hexadecylamino)-14,14-dicyano-4,5,9,10-tetrahydropyrenoquinodimethane.

25. A process in accordance with claim 17 wherein the quinodimethane is 13,13-ethylenediamino-14,14-dicyano-4,5,9,10-tetrahydropyrenoquinodimethane.

26. A process for preparing a nonlinear optical medium which comprises coating a transparent solid substrate surface by Langmuir-Blodgett deposition technique with a continuous film of at least one monomolecular layer of uniaxially aligned quinodimethane molecules corresponding to the formula:

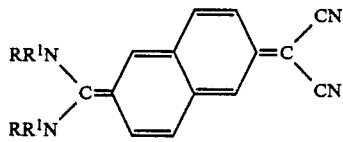

where R is a substituent selected from aliphatic, alicyclic and aromatic groups containing between about 6-30 carbon atoms, and $R^1$ is hydrogen or a R substituent; wherein the deposition technique comprises (1) compressing the monomolecular layer of quinodimethane molecules spread on the water surface in a Langmuir-Blodgett trough until the area per uniaxial aligned molecule is less than about 55 Å$^2$/molecule; (2) reducing the compression on the monomolecular layer by about 5-40 dynes per centimeter; and (3) dip-coating the substrate with the monomolecular layer while maintaining a constant compression on the area of uniaxially aligned quinodimethane molecules spread on the water surface.

27. A process in accordance with claim 26 wherein n in the quinodimethane formula is zero.

28. A process in accordance with claim 26 wherein n in the quinodimethane formula is one.

29. A process in accordance with claim 26 wherein the R substituent in the quinodimethane formula is in an alkyl group containing between about 10-20 carbon atoms, and $R^1$ is hydrogen.

30. A process in accordance with claim 26 wherein the substrate surface coating comprises at least two monomolecular layers of uniaxially aligned quinodimethane molecules.

31. A process in accordance with claim 26 wherein the nonlinear optical medium exhibits second order nonlinear optical susceptibility $\chi^{(2)}$.

32. A process in accordance with claim 26 wherein the nonlinear optical medium exhibits third order nonlinear optical susceptibility $\chi^{(3)}$.

33. A process in accordance with claim 26 wherein the quinodimethane is 11,11-di(hexadecylamino)-12,12-dicyano-2,6-naphthoquinodimethane.

34. A process in accordance with claim 26 wherein the quinodimethane is 11,11-ethylenediamino-12,12-dicyano-2,6-naphthoquinodimethane.

35. A coated substrate produced in accordance with the process of claim 1.

36. A nonlinear optical medium produced in accordance with the process of claim 6.

37. A nonlinear optical medium in accordance with the process of claim 17.

38. A nonlinear optical medium in accordance with the process of claim 26.

* * * * *